US006613830B2

(12) United States Patent
Stevenson et al.

(10) Patent No.: US 6,613,830 B2
(45) Date of Patent: *Sep. 2, 2003

(54) AQUEOUS BASE COATING COMPOSITION FOR POLYOLEFIN SURFACES

(75) Inventors: Michael J. Stevenson, 1200 Soldier Pass Rd., Sedona, AZ (US) 86336; Robert A. Reeves, Cottonwood, AZ (US); Matthew P. Stevenson, Sedona, AZ (US)

(73) Assignee: Michael J. Stevenson, Sedona, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,910

(22) Filed: Jan. 29, 1999

(65) Prior Publication Data

US 2002/0007004 A1 Jan. 17, 2002

(51) Int. Cl.[7] ............... C08L 23/06; C08L 31/04; C08L 33/02; C08L 33/08; C08L 75/00
(52) U.S. Cl. ............ 524/501; 524/271; 524/487; 524/507; 524/522; 524/523; 524/524; 427/412.3
(58) Field of Search ............... 523/160, 161; 524/501, 507, 271, 487, 522, 523, 524; 427/208, 412.3

(56) References Cited

U.S. PATENT DOCUMENTS

| 2,628,172 | A | * | 2/1953 | Jenett | 427/375 |
| 3,273,496 | A | * | 9/1966 | Martin | 101/488 |
| 3,432,339 | A | * | 3/1969 | Howell et al. | 427/375 |
| 3,985,932 | A | * | 10/1976 | Porter | 428/326 |
| 5,126,390 | A | * | 6/1992 | Duff | 524/276 |
| 5,158,606 | A | * | 10/1992 | Carlick et al. | 524/145 |
| 5,746,961 | A | * | 5/1998 | Stevenson et al. | 264/255 |
| 5,889,083 | A | * | 3/1999 | Zhu | 523/161 |

FOREIGN PATENT DOCUMENTS

| DE | 3316550 | * | 11/1984 |
| WO | WO 94/28077 | * | 8/1994 |
| WO | WO 98/22226 | * | 5/1998 |

OTHER PUBLICATIONS

Lewis. Sr., Richard J.; Hawley's Condensed Chemical Dictionary 13th Ed., John Wiley and Sons, New York (pp. 897–898), 1997.*

English Translation of DE3316550, 1984.*

* cited by examiner

Primary Examiner—Callie Shosho
(74) Attorney, Agent, or Firm—Robert E. Strauss

(57) ABSTRACT

There is disclosed an aqueous-base coating composition containing, as essential components, finely-divided, water-dispersable: colorant, polyethylene, binder and water with sufficient of a surface active agent to form a stable suspension. The coating composition is applied as a film coating onto a polyethylene surface and the binder temporarily binds the coating to the surface until the coating can be thermally treated to incorporate the coating into the polyethylene, permanently coloring the surface. The invention also comprises a method for the preparation of the aqueous-base coating composition in which the essential components are prepared as aqueous dispersions or emulsions which are blended together to form the final coating composition.

9 Claims, No Drawings

AQUEOUS BASE COATING COMPOSITION FOR POLYOLEFIN SURFACES

BACKGROUND OF THE INVENTION

1. Field of Invention

This invention relates to a composition for the decoration and/or coloration of polyolefin surfaces and to a method for its preparation.

2. Brief Statement of the Prior Art

Polyolefin surfaces and, in particular, polyethylene surfaces are very non-receptive to coatings such as paints, inks and the like. Consequently, it is very difficult to impart a permanent indicia, either decoration or printed matter, on the surface of a polyolefin object. Various techniques have been attempted such as flame treatment to condition or partially oxidize the surface of the polyolefin object to render it receptive to a pigmented coating materials such as inks or paints.

In U.S. Pat. Nos. 4,252,762 and 4,519,972, methods are disclosed for imprinting or decorating the surface of rotationally molded products. The methods comprise coating the interior surfaces of the rotational mold with a suspension of a pigment in an oil or wax, followed by an otherwise conventional rotational molding operation. While these patented methods achieve a permanent bonding of paints or inks to a polyolefin object, it is frequently desirable to apply graphics or printing to polyolefin objects after their formation.

In our prior patent U.S. Pat. No. 5,746,961, we disclose a coating composition of particles of polyethylene and a surface enhancing solid such as Teflon suspended in an organic or aqueous liquid carrier and the method of its use to enhance the surfaces of molded plastic parts. In our application, U.S. Ser. No. 08/914,536, we disclose and claim a related coating composition of particles of polyethylene and a colorant (pigment) suspended in an organic liquid carrier and a method of its use to color the surfaces of molded polyolefin articles. These compositions are applied as a film onto the surfaces of polyethylene objects and are permanently incorporated into the polyethylene surfaces by mild heating. Critical to the functioning of these coatings is the presence of a binding component to retain the coating film on the polyethylene surfaces prior to the heating step.

Environmental concerns have disfavored use of coating compositions with organic carriers or solvents, and it desirable to provide colorant coating compositirly all liquids, particularly aqueous liquids, imposing obstacles to the use of aqueous base coating compositions and to the preparation of a stable dispersion of polyethylene particles in the water carrier.

OBJECTIVES OF THE INVENTION

It is an objective of this invention to provide an aqueous-base composition for the coloration of the surface of a polyolefin object.

It is a further objective of the invention to provide a method for the preparation of a stable aqueous-base coating composition containing components of particulate polyethylene, colorant and binder.

It is likewise an objective of this invention to provide an aqueous-base coating composition containing particulate polyethylene with a binder that is effective in retaining an applied film of the coating composition after its application to the surface of a polyolefin object and prior to the thermal bonding of the composition into the polyethylene surface.

Other and related objectives will be apparent from the following description of the invention.

BRIEF DESCRIPTION OF THE INVENTION

This invention comprises an aqueous-base coating composition containing, as essential components, finely-divided, water-dispersable: colorant, polyethylene, binder and water with sufficient of a surface active agent to form a stable suspension. The coating composition is applied as a film coating onto a polyethylene surface and the binder temporarily binds the coating to the surface until the coating can be thermally treated to incorporate the coating into the polyethylene, permanently coloring the surface. The invention also comprises a method for the preparation of the aqueous-base coating composition in which the essential components are prepared as aqueous dispersions or emulsions which are blended together to form the final coating composition.

DESCRIPTION OF THE PREFERRED EMBODIMENT

The invention comprises an aqueous-base coating composition which contains finely-divided, water-dispersable polyethylene, colorant, binder and water with sufficient of a surface active agent to form a stable suspension and a method for its preparation.

The polyethylene component of the coating composition has a finely subdivided or powdered state with a particle size from less than 1 micron to about 140 microns, preferably from 5 to about 40 microns, maximum particle diameter. The density of the polyethylene powder ranges from about 0.88 to 0.97 grams per cubic centimeter. Examples of suitable polyolefins include low, high and linear low density polyethylene, polypropylene, ethylene/vinyl acetate copolymers, ultra high molecular weight polyethylene and metallocene catalyst polyolefins.

The polyethylene is used in an amount from 20 to about 80, preferable from 25 to 50, weight percent of the total solids content of the coating composition.

Various pigments can be used as the colorant component. Pigments which are useful include those containing inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc. Various organic pigments which are useful include azo pigments, such as benzimidazolone pigments, pyrazolone pigments, copper phthalocyanine, quinacridones, anthraquinones, condensation pigments, tetra-chloro-isoindolinones, carbon blacks, etc. The solid colorants should be of the same size range as specified for the polyethylene component and should be prepared as a water dispersion with sufficient of a surface active agent to form as stable suspension.

The colorant is used at a concentration from 1 to about 60, preferable from 1 to 40, weight percent of the solids content of the coating composition. The effective amount depends on the type and identity of the selected colorant.

The binder component functions to retain the film coating on the polyethylene surface after application of the coating composition and to modify the gloss, flexibility and hardness of the final coating. Useful binders are aqueous emulsions, dispersions or emulsifiable solids of polyacrylic acid and polyacrylates, polyurethanes, poly(vinyl-acetate) and copolymers and mixtures thereof. Particularly useful is a polyacrylic and polyurethane emulsion. Other binders can be used such as hydrocarbon resins, petroleum waxes, synthetic waxes, chlorinated pololefins, rosin, rosin esters and terpene base resins.

The binder is used at a concentration from 10 to about 75, preferably from 25 to about 60, weight percent of the solids in the coating composition. The effective concentration will vary depending on the selection of the binder; the preferred urethane-acrylic emulsion is very effective at a concentration from 25 to 60 weight percent of the solids in the coating composition.

Useful surface active agents include hydrocarbon silicone and fluorocarbon surfactants, non-ionic surfactants and ionic surfactants. Examples of non-ionic surfactants are ethylene oxide condensates of vegetable oils, alcohols, phenols, organic acids and hydroxy esters. Included in such compounds are castor oil, tall oil and linseed oil condensates of ethylene oxide having 5 to 70 weight percent of oxyethylene units. Other non-ionic surfactants include polyethylene aliphatic ethers such as polyoxyethylene lauryl ether, polyoxyethlene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene ethyl amine and the like; polyoxyethylene thioethers such as polyoxyethylene n-dodecyl thioether; and polyalkene oxide modified polydimethylsiloxanes.

Ionic surfactants which can be employed herein include anionic compounds obtained by sulfonation of fatty derivatives such as sulfonated tallow, sulfonated vegetable oils and sulfonated marine animal oils. Various sulfonated and sulfated fatty acid esters of mono- and polyvalent alcohols are also suitable such as a sulfated butyl ester of a fatty ester, sulfated fatty esters, etc.

Sufficient amounts of the surfactant are used to achieve a stable suspension of the components in the coating composition. Typically, the effective concentration will be from 0.1 to about 2 weight percent of the solids content in the coating composition, depending on the particular surfactant which is used.

The coating composition has sufficient water to provide a solids content from 15 to about 85, preferably from 25 to about 60, weight percent and can be thinned with water as desired to provide an appropriate viscosity for application, either by spraying, brushing, rolling, or dipping of the polyethylene surface with the coating composition.

The components should be prepared as stable aqueous dispersions which are blended together to prepare the coating composition. For this purpose, water containing a surface active agent is admixed with the powdered solid components and the mixture is blended in a mixer suitable for stirring solids into liquids without frothing. If desired or necessary, an anti-foaming agent can be added. The binder component is usually commercially available as a stable emulsion or solid dispersion and can be used without modification other than possible adjustment of its water content as required for the coating composition formulation.

The coating composition is prepared by blending the aqueous dispersions of the components with water and additional surfactant added, as necessary. Preferably, the polyethylene and pigment components are separately blended with water and surfactant, then the binder component is added while mixing to insure adequate dispersion.

If necessary optional additives such as fillers, e.g., silica, silicates, glass bubbles, etc., are added as desired to provide the optimum viscosity of the coating composition, which should be from 2_ cps to about 200 cps.

The coating composition can be applied as a film coating on the selected polyethylene surface by spraying, rolling, brushing the coating composition using conventional application equipment, or the polyethylene object can be dipped in the coating composition. After application, the resultant film coating must be fused to the coated polyethylene surface by heating the surface to a mild temperature from 250° F. to about 350° F., taking care to avoid excessive temperatures or temperature differentials which could cause the polyethylene object to distort or warp.

The heating can be accomplished using a suitable radiant source such as an open flame or a high temperature electrical heater, e.g., by passing the polyolefin object 40 beneath an infrared heater. The heating step is practiced to apply heat only to the coated polyethylene surface sufficiently to fuse the film coating into the surface of the polyolefin object 40. The coated polyethylene surface is heated until a smooth clear surface can be observed, indicating that the coating has been incorporated into the polyethylene object. Thereafter, the polyethylene object is cooled to ambient otected with clear coating. The clear coating composition has substantially the same composition as the colorant coating composition except that the colorant component is not included in the clear coating composition. If desired, some of the translucent colorants such as pearlescants can be added in amounts from 0.5 to about 5 weight percent of the solids content to achieve special effects on the polyethylene surface. Also, the concentration of the binder solid in the clear coating composition can be adjusted to provide variations in the gloss, hardness or chemical resistance. As an example, the amount of the polyurethane-acrylic emulsion can be increased by 5 to 25 percent to provide higher gloss, hardness and chemical and ultra-violet resistance in the coated polyethylene surface.

The clear coating composition is applied in the same manner as the colorant coating composition and can be applied before or after the heating step. If it is applied after the heating step, the polyethylene surface is subjected to another heating step to fuse the clear coating.

The coating and indicia and the surface of the polyolefin object are heated until a smooth clear surface can be observed on the coated polyethylene surface, indicating that the coating and indicia have been incorporated into the polyolefin object, into the surface thereof. Thereafter, the polyolefin object is cooled to ambient or room temperature.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A method of permanently coloring a polyethylene surface of a polyethylene object which comprises:

applying an aqueous-base colorant coating composition containing solids in water to said polyethylene surface to form a colorant coating on said surface, which aqueous-base colorant coating composition comprises:
   a. finely-divided, water-dispersable polyethylene solids with a maximum particle diameter less than 140 microns in an amount from 20 to about 80 weight percent of said solids;
   b. finely-divided, water-dispersable pigment solids in an amount from 1 to about 60 weight percent of said solids;
   c. a binder selected from the class consisting of aqueous emulsions or dispersions of polyacrylic acid and polyacrylates, polyurethanes, poly(vinyl-acetate) and copolymers, emulsifiable hydrocarbon waxes, rosins, rosin esters, polyterpene, synthetic waxes, chlorinated polyolefins, and mixtures thereof in an amount from 10 to about 75 weight percent of said solids, sufficient to adhere said coating to said polyethylene surface;
   d. a non-ionic or ionic surfactant in an amount from 0.1 to about 2 weight percent of said solids, sufficient to form a stable water dispersion of said solids; and
   e. sufficient water to provide a solids content of said aqueous colorant coating composition from 15 to about 85 weight percent; and applying heat to heat only said coating and said polyethylene surface to a temperature sufficient to permanently fuse the aqueous-base colorant coating composition into the polyethylene surface and form a smooth, clear surface while avoiding heating of said polyethylene object sufficiently to cause warping or distorting said polyethylene object.

2. The method of claim 1 wherein said binder is an acqueous emulsion of a mixture of polyurethane and polyacrylate.

3. The method of claim 2 wherein said colorant coating composition comprises a mixture of from 1 to 40 weight percent of said pigment, 25 to 50 weight percent of finely divided polyethylene particles and 25 to 60 weight percent of said binder solids.

4. The method of claim 1 wherein said polyethylene particles have a density from 0.88 to 0.97 grams per cubic centimeter.

5. The method of claim 1 wherein said polyethyle particles have a maximum particle diameter from 5 to about 40 microns.

6. The method of claim 1 wherein said heating is sufficient to raise the temperature of said surface to between 250 and 350 degrees F.

7. The method of claim 1 wherein said aqueous-base colorant coating composition is prepared by a method comprising the steps of:
   a. preparing a stable aqueous dispersion of each of the polyethylene solids, pigment solids and binder with sufficient of said surfactant to form a stable aqueous dispersion, and
   b. blending said aqueous dispersions together while mixing and adding sufficient water thereto to prepare said coating composition with a solids content from 15 to about 65 weight percent.

8. The method of claim 7 wherein an aqueous dispersion of said pigment solids is added to an aqueous dispersion of said polyethylene solids and an aqueous dispersion of binder is added to the resultant mixture.

9. The method of claim 7 wherein said coating composition has a solids content from 25 to 60 weight percent.

\* \* \* \* \*